(12) United States Patent  
Magi et al.

(10) Patent No.: US 10,114,481 B2
(45) Date of Patent: Oct. 30, 2018

(54) FLEXIBLE DISPLAY SENSING (71) Applicant: Intel Corporation, Santa Clara, CA (US)

(72) Inventors: Aleksander Magi, Aloha, OR (US); Joshua L. Zuniga, Damascus, OR (US); David W. Browning, Beaverton, OR (US); Rajiva K. Sarraju, Portland, OR (US); Guy M. Therien, Beaverton, OR (US); Audrey C. Younkin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/388,894

(22) Filed: Dec. 22, 2016

(65) Prior Publication Data
US 2017/0185170 A1   Jun. 29, 2017

(51) Int. Cl.
*G06F 3/0346* (2013.01)
*G06F 3/01* (2006.01)

(52) U.S. Cl.
CPC ............ *G06F 3/0346* (2013.01); *G06F 3/017* (2013.01)

(58) Field of Classification Search
CPC ................... G06F 3/0346; G06F 3/017; G06F 2203/04102
USPC .......................................................... 345/156
See application file for complete search history.

(56) References Cited

U.S. PATENT DOCUMENTS

| | | | | |
|---|---|---|---|---|
| 2010/0066665 A1* | 3/2010 | Yoneda | ................... | G06F 1/162 345/156 |
| 2012/0038570 A1* | 2/2012 | Delaporte | ............. | G06F 1/1616 345/173 |
| 2015/0309611 A1* | 10/2015 | Vertegaal | ........... | A47G 19/2227 345/174 |
| 2016/0349858 A1* | 12/2016 | Lee | ........................... | G06F 3/03 |

* cited by examiner

*Primary Examiner* — Stephen G Sherman
(74) *Attorney, Agent, or Firm* — Jordan IP Law, LLC (57) ABSTRACT

Systems, apparatuses and methods may provide for a flexible display detection system to detect movement (e.g., flexing) of a flexible display screen on a device and to interpret the movement as a gesture or selection of a device mode. Embodiments may utilize bendable sensors located adjacent to the flexible display, and may divide a display into multiple panel sections (e.g., three panels) connected to one another via hinging portions of the flexible display. Depending on the arrangement of the sections, the device may be operated in a different mode such as, for example, a tablet mode, a reader mode, or a phone mode.

20 Claims, 11 Drawing Sheets

FIG. 21 ously. More particularly,
FLEXIBLE DISPLAY SENSING

CROSS-REFERENCE RELATED APPLICATIONS

The present application claims benefit of priority to International Patent Application No. PCT/US2015/000434, filed Dec. 24, 2015.

TECHNICAL FIELD

Embodiments generally relate to portable electronic devices and mobile computing platforms on which a user interacts with a screen via gestures. More particularly, embodiments relate to devices in which a user interacts with a device having a flexible display.

BACKGROUND

Portable electronic devices such as a smart phone, a cell phone, a tablet computer, a convertible tablet, a notebook computer, a personal digital assistant (PDA), a mobile Internet device (MID), a media player, a radio, an infotainment system, etc., or any combination thereof, generally include displays having an interface through which a user interacts with the device. The user may, for example, interact with a display of a device via a gesture performed by the user with respect to the display. The display may be rigid, and equipped with a touch sensitive capability for facilitating user interactions. In this regard, the range of possible user interactions may be constrained to interactions that require the user to press down on the display. In another example where a gesture involves movement, the user interactions may be uni-axial with respect to the display. Such interactions may be cumbersome and limiting from a user perspective, since users tend to interact with their environment not simply by pushing buttons, but by grabbing, squeezing, bending, and flexing objects in their hands.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

An electronic device may be a portable electronic device. The term portable electronic device may refer to a mobile device (e.g., smart phones, etc.), which may have geo-location capability, an ability to communicate with another device, an interactive display, multi-sensing capabilities, and/or other features. Thus, a portable electronic device may have access to one or more of the capabilities included in a smart phone such as geo-location, sensors, access to the internet via Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), near field communications, Bluetooth (e.g., IEEE 802.15.1-2005, Wireless Personal Area Networks) or other communication protocol. The access to one or more capabilities may be direct access and/or may be indirect access such as via a Bluetooth connection with a nearby smart phone, a wearable device worn elsewhere on a user, and so forth.

An electronic device may include an interface to interact with a user. For example, a user may interact with a portable electronic device via a substantially inflexible display, wherein the display may include a tactile screen overlay of capacitive touch sensors. Interactions with a substantially inflexible display may be one-dimensional with respect to the display, wherein the user may typically moves a finger or stylus along an axis orthogonal to or parallel with the display to interact with the display. The user may also engage in more complex gestures, such as swiping a finger across the display or enacting a pinching motion on the display. If the display is inflexible, the possibilities for user interaction with the display may be limited by the degrees of freedom that the display may accommodate.

Embodiments disclosed herein present interactions between a user and an electronic device having a flexible screen. The term "flexible" may reference a capability of a display to non-destructively sustain any or all of a flexible movement, a stretching movement, a flexing, a flexure, a bending, a twisting, a torsion, a squeezing, or a warping movement when subjected to force or torque levels of an order provided by a user when using the device. Examples of flexible displays include displays based on organic light emitting diodes (OLED) technologies, as well as any other type of display that is flexible. Flexing (and similar movements) of the display may be detected when the display is matched with bendable sensors, wherein flexing (and similar movements) may be used to define one or more modes of device operation as well as one or more gestures for interacting with the device.

Figures 1, 2, 3A:
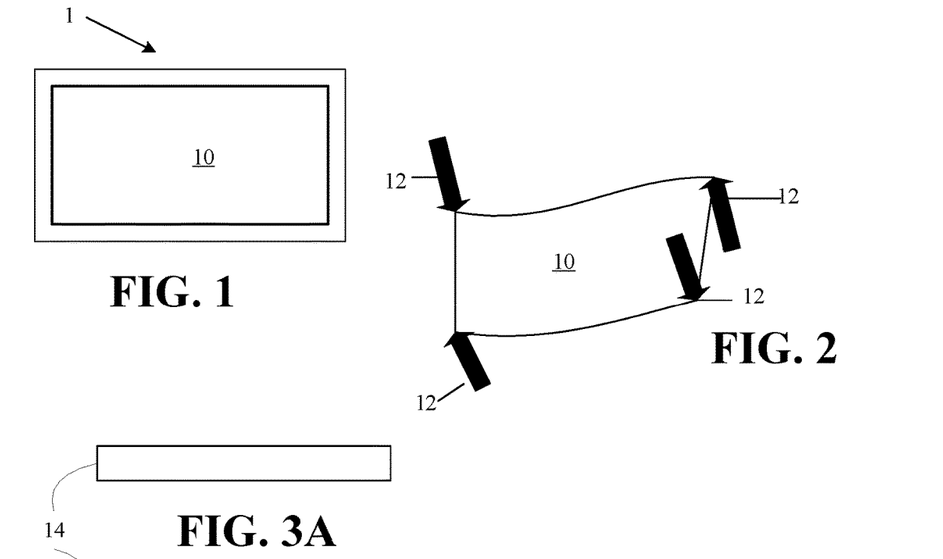
FIG. 1 is an example of a portable device having a flexible screen shown in an unflexed state according to an embodiment.
FIG. 2. is an example of a flexible screen shown in a flexed state according to an embodiment.
FIGS. 3A-3B are top and side views, respectively, of an example of a bendable sensor shown in an unbent state according to an embodiment.

Turning now to FIG. 1, a device 1 having a flexible display 10 (e.g., a display that is flexible) is shown according to an embodiment. The device 1 may be part of an electronic device such as a tablet, a smart phone, a gaming platform, a controller, or other hand-held electronic device. FIG. 1 shows the flexible display 10 in an unflexed state. As shown in FIG. 2, the display 10 may be flexed into a flexed state in response to the application of various force vectors 12 to the perimeter of the flexible display 10. The flexible display 10 may have an overlying touch screen with capacitive touch sensing capability.

Figures 3B, 5:
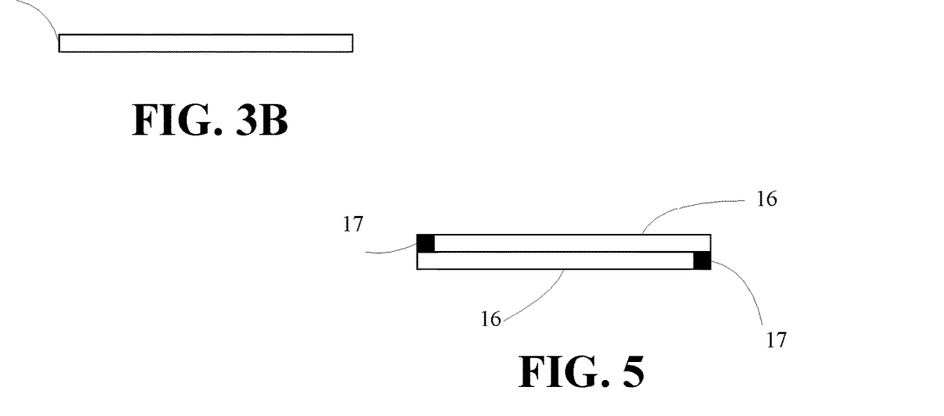
FIG. 5 is a side view of an example of two bendable sensors shown mated to one another and in an unbent state according to an embodiment.

Turning now to FIGS. 3A-3B, an example of a bendable sensor 14 is shown (not necessarily drawn to scale), wherein the bendable sensor 14 may be provided with a flexible display such as the flexible display 10 (FIG. 1), discussed above. The bendable sensor 14 produces a signal in response to a variety of mechanical loadings and/or physical displacements that correspond to a bending movement, which may include any or all of a flexing movement, a stretching movement, a twisting movement, a flex movement, or a flexure movement. In some embodiments, these movements may correspond to changes to the configuration of the display, such as from a phone, to a tablet, to a reader, as is further discussed below. In some embodiments, a bendable sensor may further be responsive to pressure, capacitance, temperature, humidity, light, and/or chemicals. Thus, by placing one or more bendable sensors, such as the bendable sensor 14, in direct and bound contact with a flexible display, such as flexible display 10, the bendable sensors may match movements occurring on a portion of the flexible display to which they are attached. In addition, a signal produced by the bendable sensor 14 in response to any or all of the aforementioned movements may be used as an indication of the movement to which the flexible display 10 has been subjected by outside forces (e.g., a bending movement movement).

The bendable sensor 14 may have an aspect ratio as shown in FIG. 3A-3B, or they may be more or less elongate and/or more or less thinner or thicker than shown. The particular aspect ratios and sizes shown in the figures are for illustrative purposes only.

Figure 4:
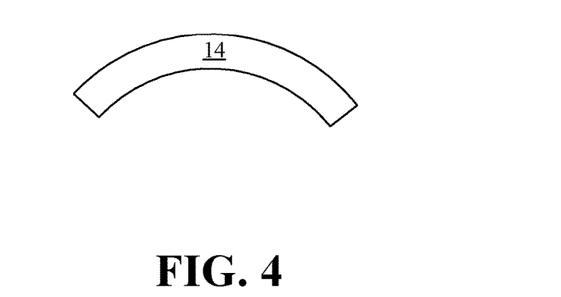
FIG. 4 is a side view of an example of a bendable sensor shown in a bent state according to an embodiment.

In general, bendable sensors may be coupled to the display, i.e., attached to, embedded behind, affixed to, or on top of the display. When used in conjunction with a non-transparent flexible display, the bendable sensor 14 may be located beneath the display so that flexure of the display results in a comparable bending of the bendable sensor 14. An example of a bendable sensor 14 in a bent state is shown in FIG. 4. In some embodiments, bendable sensor 14 may be capable of responding to flexures in both a positive and negative direction of bending (up to +/−180 degrees), whereas in other embodiments, a particular bendable sensor employed may, for example, be sensitive only to bending in a particular direction. In this regard, as shown in FIG. 5, two bendable sensors 16, oriented opposite to one another as indicated by the shading on their respective tips 17, may be bound to one another and used as a single compound bendable sensor having a full range of response.

Figure 6:
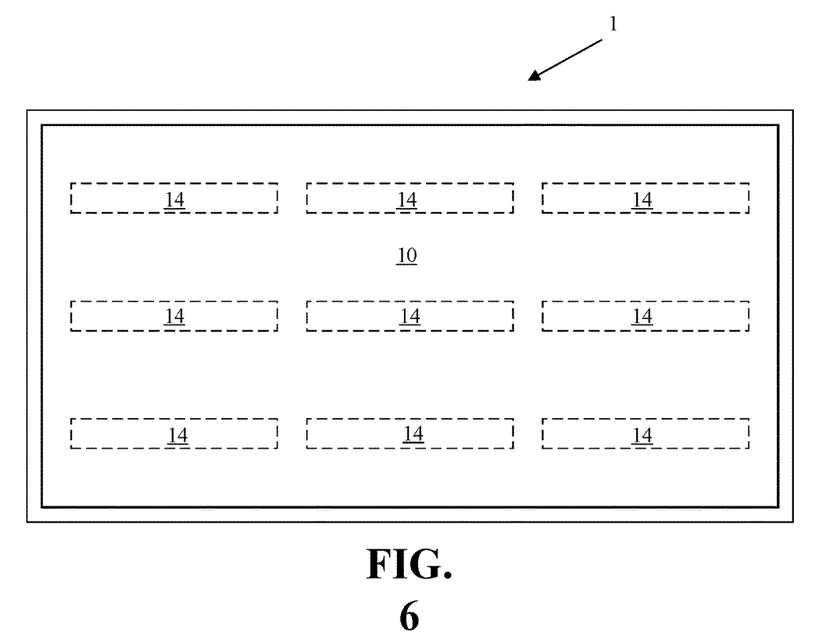
FIG. 6 is a top plan view of an example of a device having a flexible display according to an embodiment.
Figure 7:
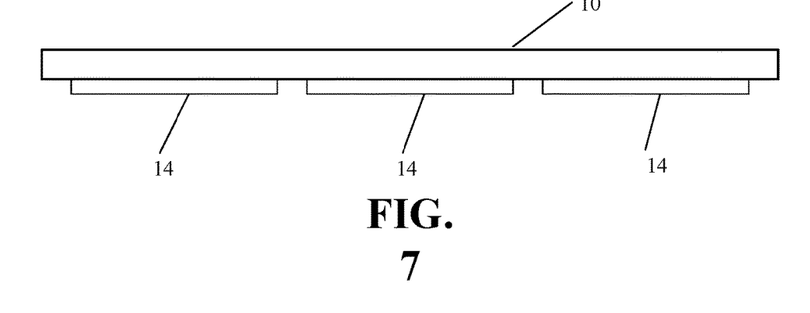
FIG. 7 is a side view of the flexible display of FIG. 6 according to an embodiment.

FIG. 6 shows the device 1 with the flexible display 10 and an array of bendable sensors 14 provided along the underside of the flexible display 10. In the illustrated embodiment, the bendable sensors 14 may not be transparent, and it may be more convenient to locate the bendable sensors 14 beneath the flexible display 10, as shown in FIG. 7. The particular arrangement, number, and type of bendable sensors 14 shown is for illustrative purposes. Thus, more or fewer bendable sensors 14 may be employed. In addition, the bendable sensors 14 may share a common orientation, as shown in FIG. 6, have a different orientation than shown, or be composed of a mixture of bendable sensors 14 having varied orientations.

Figure 8:
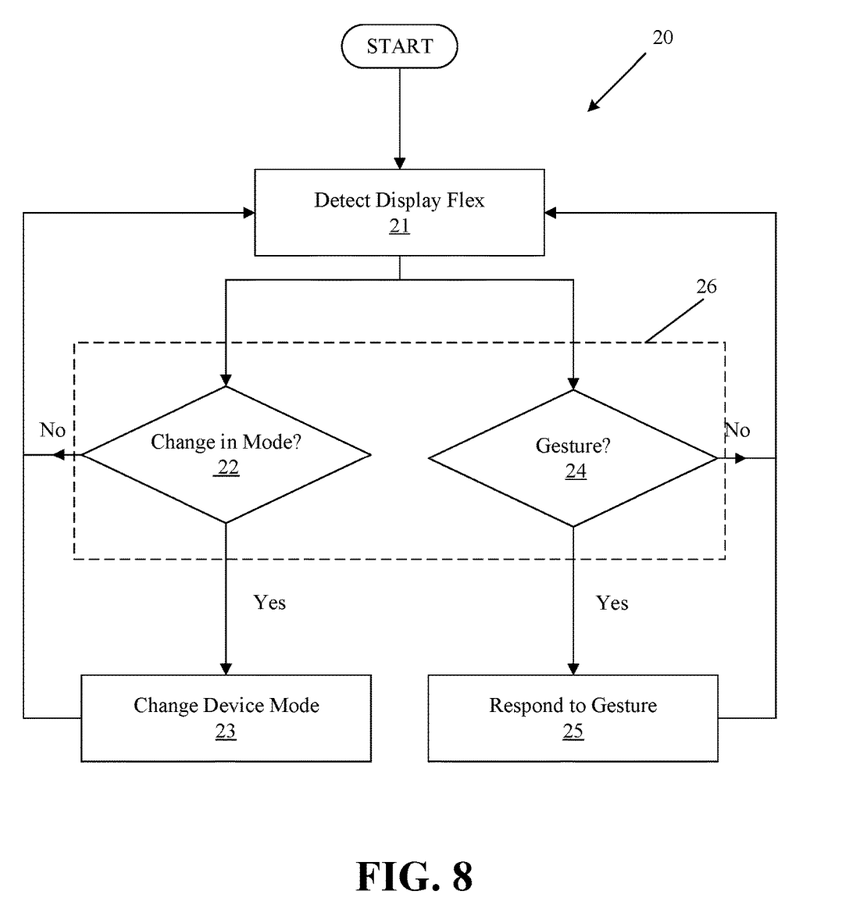
FIG. 8 is flowchart of an example of a method of an interaction with a flexible display according to an embodiment.

FIG. 8 shows a flowchart of an example of a method 20 of detecting and using a flex of a flexible display to set a device mode and determine a gesture. The method 20 may be implemented as one or more modules in a set of logic instructions stored in a machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 20 may be written in any combination of one or more programming languages, including an object oriented programming language such as Java, Smalltalk, C++ or the like and conventional procedural programming languages, such as the "C" programming language or similar programming languages.

Illustrated processing block 21 detects a bending movement (e.g., flexing, twisting, etc.) on a flexible display. Detection may be based on data provided by one or more bendable sensors, such as the bendable sensors 14 (FIGS. 1-7), discussed above. When a flex or flexing of the flexible display has been detected, the method 20 proceeds along two branches. On the left branch, processing block 22 determines whether the movement of the flexible display corresponds to a mode and if so, whether the movement corresponds to a change in a current mode of device operation. The mode may relate to a device configuration, form factor, power state, and/or other aspect of device use. If no change in mode is associated with the movement of the flexible display, then control passes back to block 21. If a change in mode is indicated, then the mode of the device is changed at illustrated processing block 23, after which control passes back to block 21 for further detection of movement of the flexible display.

In parallel or in sequence with the left branch, processing block 24 determines whether the movement detected of the flexible display corresponds to a user gesture. If no correspondence to a gesture is determined, then control passes back to block 21 for further detection of movement of the flexible display. If the movement does correspond to a gesture, then a response to the gesture is generated at illustrated processing block 25, after which control passes back to block 21 for further detection of movement of the flexible display.

In another embodiment, shown in broken line in FIG. 8, blocks 22 and 24 may be combined into illustrated processing block 26 that interprets a display flex to determine if a change in device mode or response to a gesture is called for. If the flex is interpreted as corresponding to a change in mode or as a gesture (and it may be both), then control passes to blocks 23 and 25 as before. If no change is called for and no gesture is detected, then control may pass back to block 21 for further detection of movement of the flexible display as before.

Figure 9:
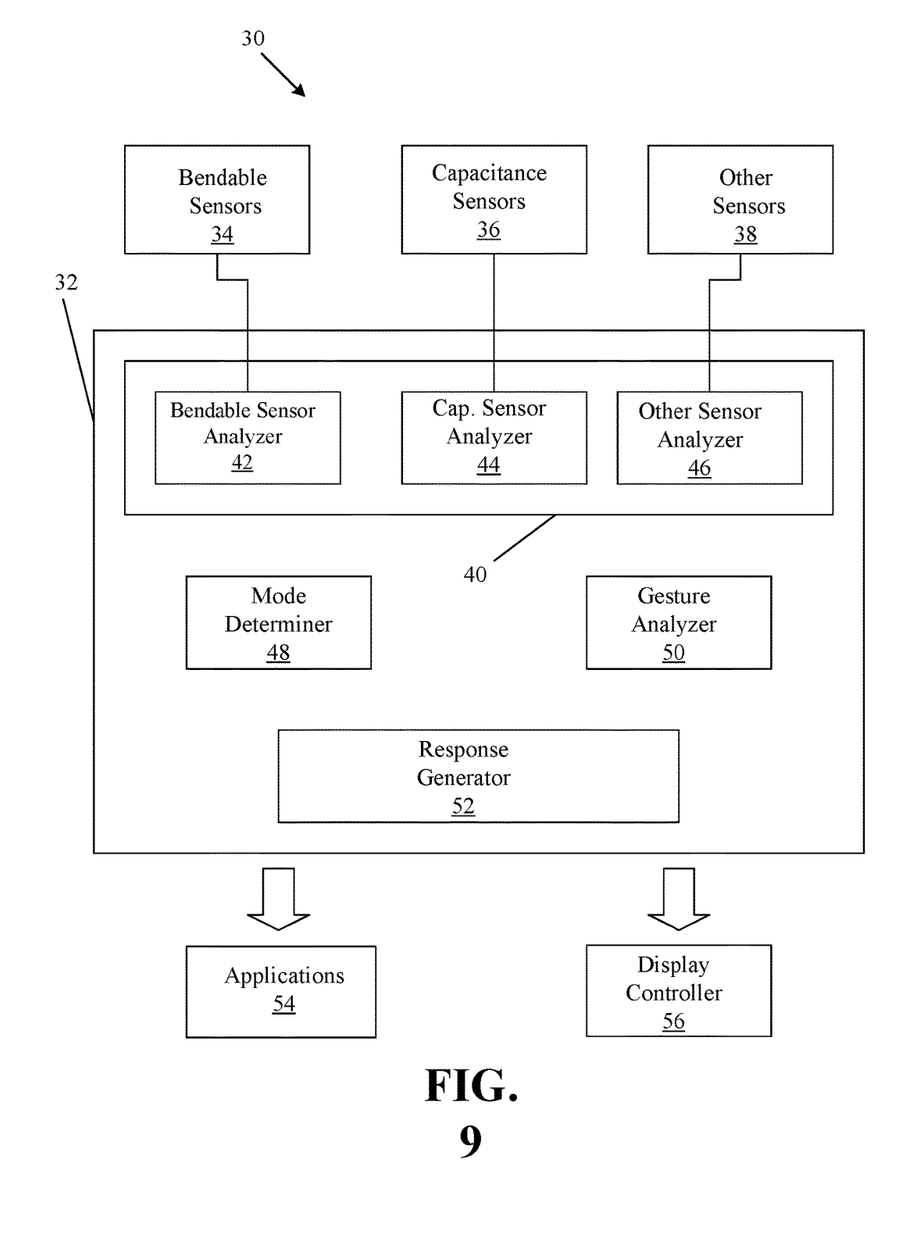
FIG. 9 is an example of a block diagram of a flexible display system according to an embodiment.

FIG. 9 is a block diagram of an embodiment of a system 30 for flexible display sensing in which a display analyzer 32 analyzes data provided by display sensors. The display sensors include bendable sensors 34, such as the bendable sensors 14 (FIGS. 1-7), discussed above. The sensors may also include capacitive sensors 36 that may be part of a tactile touch screen provided as an overlay to the flexible display 10, as well as other sensors 38 such as resistive sensors.

The sensor analyzer 40 includes a bendable sensor analyzer 42 to analyze data provide by the bendable sensors 34, a capacitive sensor analyzer 44 to analyze data provided by the capacitive sensors 36, and an "other" sensor analyzer 46 to analyze data provided by other sensors 38. In some embodiments, the capacitive sensor analyzer 44 and/or the other sensor analyzer 46 may be absent from the sensor analyzer 40, and only the bendable sensor analyzer 42 may be provided. The sensor analyzer 40 weighs the data provided by sensors 34-38 to provide a merged characterization of the available data that may be used to determine and characterize the sensors provide.

The data provided by the sensor analyzer 40 may be used by a mode determiner 48 to determine a device mode and a gesture analyzer 50 to determine a gesture. For example, an electronic device may have multiple modes of operation. An electronic device may take advantage of a foldable display to offer a single device that has multiple form factors, such as a tablet, a reader, and/or a smart phone. Each of the form factors may be a mode of operation, or more simply, a mode. Thus, data from bendable sensors 34 may be processed by the sensor analyzer 40 and used by the mode determiner 48 to determine a mode of use or operation.

Additionally, relative movements between or among portions of a flexible display may be used by a user as a gesture for controlling an aspect of the device and/or an application running on the device. In general, a display on an electronic device may offer multiple forms of interaction via user gestures made with respect to the display. A flexible display may offer additional possibilities of interaction with the device (e.g., additional gestures). The additional gestures may be defined by a user imparting, to all or to part of a flexible display, a particular movement, such as a squeezing movement, a twisting movement, a flexing movement, or a bending movement of the display. Such gestures may be interpreted in various ways according to an intention and/or design of an application developer. For example, a gesture may be interpreted as a command to turn a page in a book, a page turn, a zooming command (zoom-in or zoom-out), a change to a power setting, a link selection, an adjustment to a level of volume, a brightness control, a cursor movement, and so on. Thus, the gesture analyzer 50 determines the gesture based on the interaction of a user with a flexible display as evaluated by the sensor analyzer 40, and determines whether the sensor data corresponds to a user gesture.

Response generator 52 determines a suitable response to the determination made by the mode determiner 48 and/or the gesture analyzer 50, and passes the response to one or more applications 54, to a display controller 56, and/or other hardware. For example, if the mode determiner 48 determines that a new mode is to be entered in which power to portions of the flexible display may be turned off, then the response generator 52 directs the display controller 56 to power off the corresponding portions of the flexible display. In another example where the gesture analyzer 50 determines that a user has gestured to control some aspect of one or more applications 54, the gesture is passed to the one or more applications 54.

In some embodiments, a flexing (or similar movement) of a flexible display, such as the flexible display 10 (FIGS. 1-2), discussed above, may be interpreted as designation of a mode, a gesture, or both the designation of the mode and the gesture, and the response generator 52 may respond to either or both as is the case.

Figure 10:
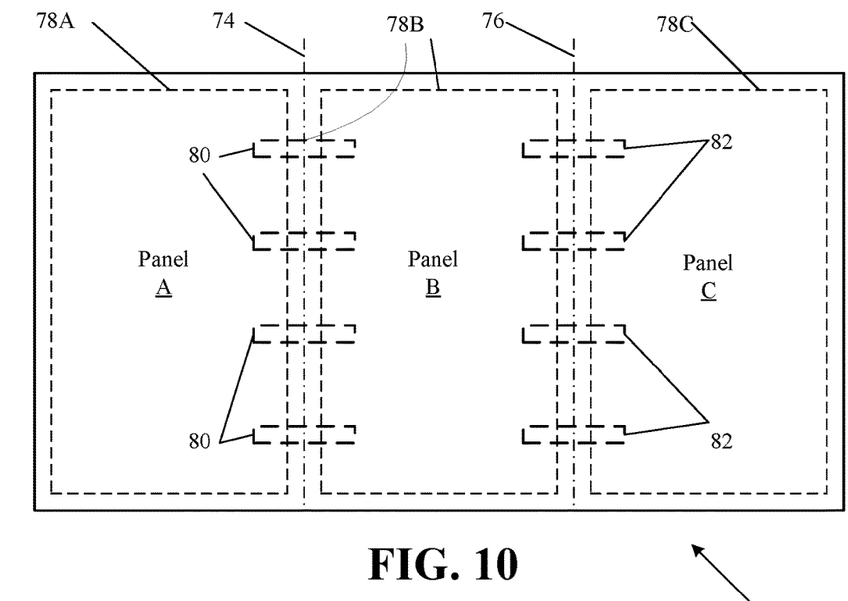
FIG. 10 is a top plan view of an example of a flexible display shown in a tablet mode according to an embodiment.
Figure 11:
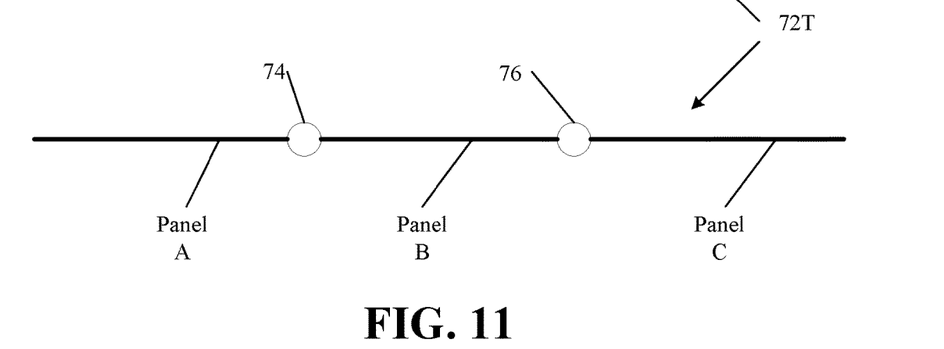
FIG. 11 is a side schematic view of the flexible display of FIG. 10 according to an embodiment.

An embodiment of a device having a flexible display that may assume any of several modes is shown in FIGS. 10-11. A flexible display 72T has a size suitable for use as a tablet computer. The flexible display 72T is divided into three panels; namely, panel A, panel B, and panel C. Panel A, panel B, and panel C are all part of and unitary with the flexible display 72T. A substantially rigid chassis is provided to each panel of the flexible display 72T to impart rigidity to the otherwise flexible panel. Thus, panel A is attached to a chassis 78A, panel B is attached to a chassis 78B, and panel C is attached to a chassis 78C. Although the panels in this embodiment may not themselves be flexible due to their attachment to their respective chassis, there may be portions of the flexible display 72T linking the panels that remain flexible, which may serve as hinges between adjacent panels. Thus, panels A and B may pivot with respect to one another about hinge 74, and panels B and C may pivot with respect to one another about hinge 76.

In addition to bendable and/or other sensors that may be provided underneath the panels A, B, and C, four bendable sensors 80 may be provided to straddle the hinge 74 linking panels A and B. Similarly, four bendable sensors 82 may be provided to straddle the hinge 76 linking panels B and C. The number of bendable sensors 80, 82 are shown is for illustrative purposes, and more or fewer bendable sensors 80,82 may be provided. In some embodiments, the hinge region may also include pressure sensors.

As shown in FIGS. 10-11, the configuration for the flexible panel 72T may be used as a tablet computer. In this regard, the configuration may take advantage of all of the flexible display 72T. Thus, the configuration shown in FIGS. 10-11 may correspond to a mode that corresponds to a tablet computer, and the mode determiner 48 (FIG. 9), discussed above, may determine that a device is in tablet mode based on data provided by the bendable sensors 80,82 and the sensor analyzer 40 (FIG. 9), discussed above. As a result, the response generator 52 (FIG. 9), discussed above, may direct the display controller 56 (FIG. 9), discussed above, to provide power to all of the flexible display 72T.

The use of a flexible display divided into discrete, substantially rigid panels in conjunction with bendable sensors permits several modes of operation in a single device. An example of a method 60 of multi-mode operation is presented in FIG. 12. The method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 60 may be written in any combination of one or more programming languages, including an object oriented programming language such as Java, Smalltalk, C++ or the like and conventional procedural programming languages, such as the "C" programming language or similar programming languages.

Figure 12:
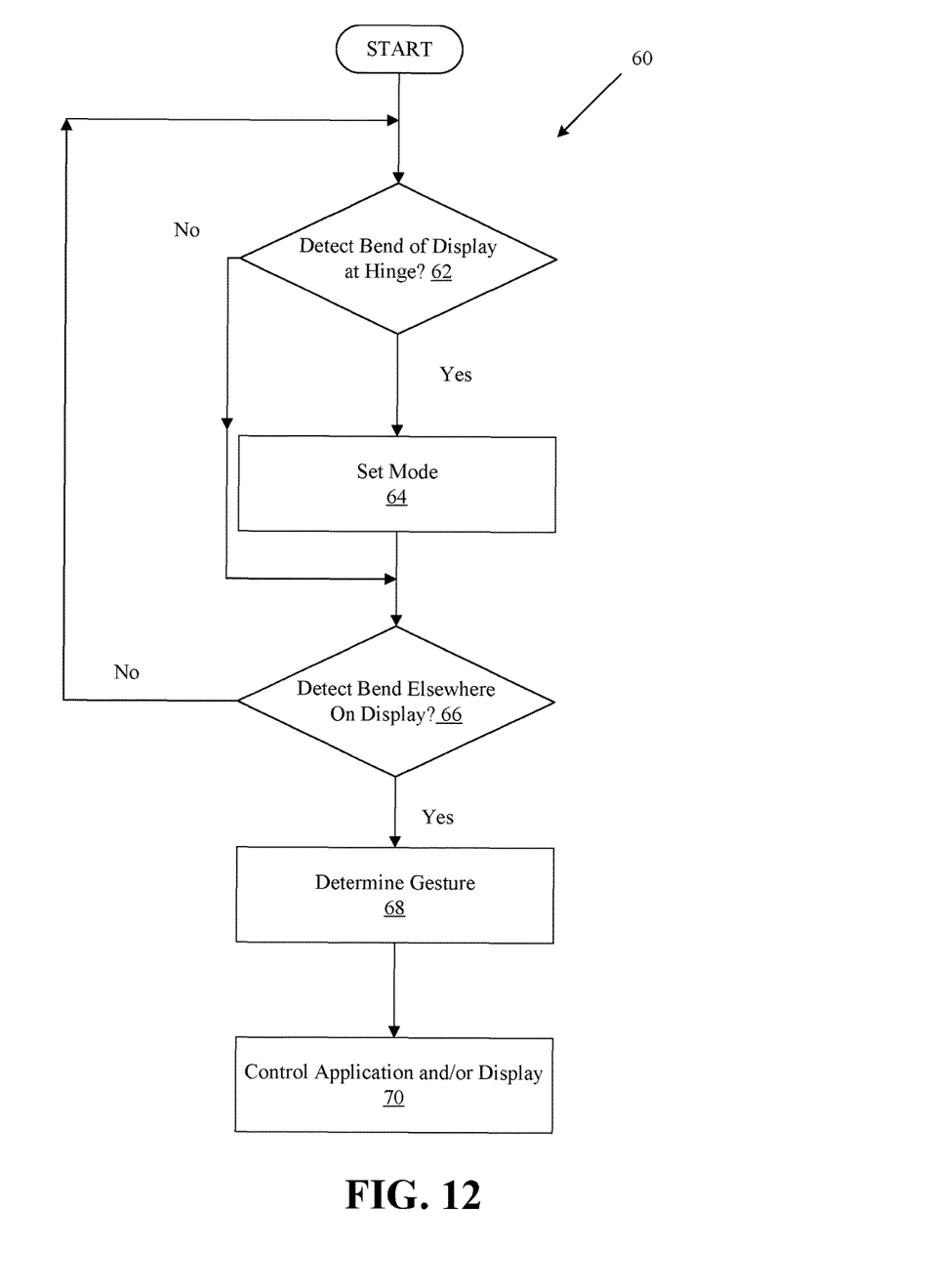
FIG. 12 is flowchart of an example of a method of interacting with a flexible display having hinges according to an embodiment.

Illustrated block 62 determines whether panels of a hinged display, such as the flexible display 72T (FIG. 10), discussed above, have been flexed or bent at one of the hinges 74,76. If it is detected that the panels have been flexed or bent, illustrated processing block 64 sets a mode of the device. The mode may be, for example, a tablet, a reader, or a phone. After the mode is set (or if block 62 returns a NO), control passes to processing block 66, which determines whether a user interaction that may correspond to some other portion of the display being flexed or otherwise manipulated by the user is detected. If no flexing or manipulation is detected, then control passes back to block 62 for further detection. If flexing or manipulation is detected, then illustrated processing block 68 determines if the flexing or manipulation corresponds to a gesture by the user. Control then passes to illustrated processing block 70, which uses the gesture (if any) to control an aspect of an application and/or the display.

In some embodiments, the interpretation to be attached to a detected bend or flexing of the display may depend on the context. For example, in some embodiments, a flex detected while in a phone mode may be interpreted as a gesture. On the other hand, a similar flex or bend of the display while in tablet mode may be interpreted differently, and may not correspond to a gesture at all. Differences in interpretation of sensor data may arise from the differing ways users hold and interact with devices. For example, a user may use one hand to grasp a phone and intend a flex to be a gesture. However, when holding a tablet with both hands, a user may inadvertently cause a similar or identical flex of the display without intending it to correspond to a gesture. Thus, in determining gesture, block 68 may take into account the context, such as the mode of the device.

Figure 13:
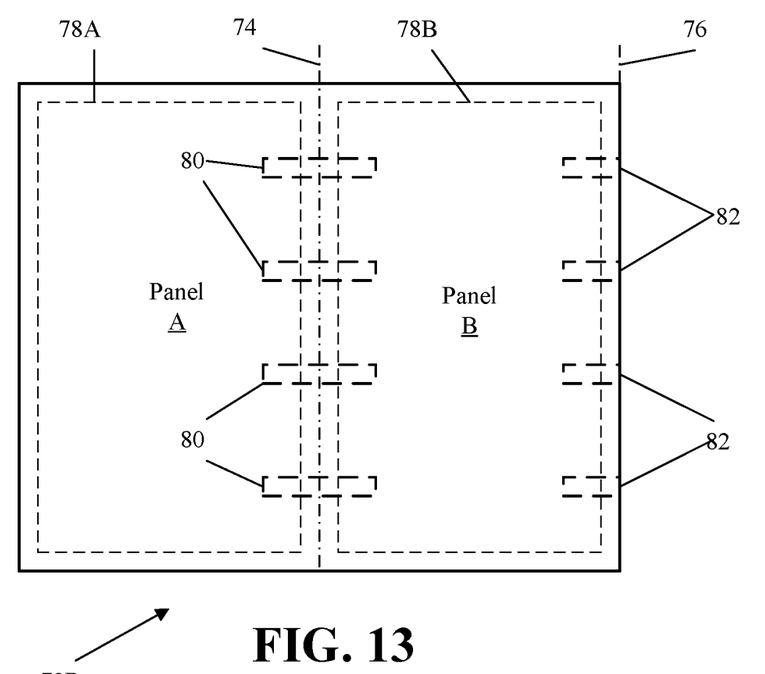
FIG. 13 is a top plan view of an example of a flexible display shown in a book mode according to an embodiment.
Figure 14:
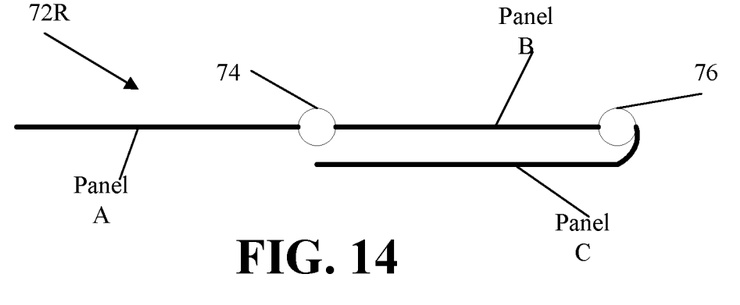
FIG. 14 is a side schematic view of the flexible display of FIG. 13 according to an embodiment.

Turning next to FIGS. 13-14, a different configuration for the flexible panel is shown than the configuration in FIG. 10-11. Panel C has been folded about hinge 76 so that it lies behind panel B, and the configuration of the flexible display 72R presented to the user is of two panels, A and B, which may be of use as a reader. Thus, the configuration shown in FIGS. 13-14 may correspond to a mode that corresponds to a reader, and the mode determiner 48 (FIG. 9), discussed above, may determine that user intends to use the device as a reader based on the data provided by the bendable sensors 80,82 to define the mode as a reader. The response generator 52 (FIG. 9), discussed above, may direct the display controller 56 (FIG. 9), discussed above, to provide power only to panels A and B and not provide power to panel C, since panel C may not be used in the reader mode.

Figure 15:
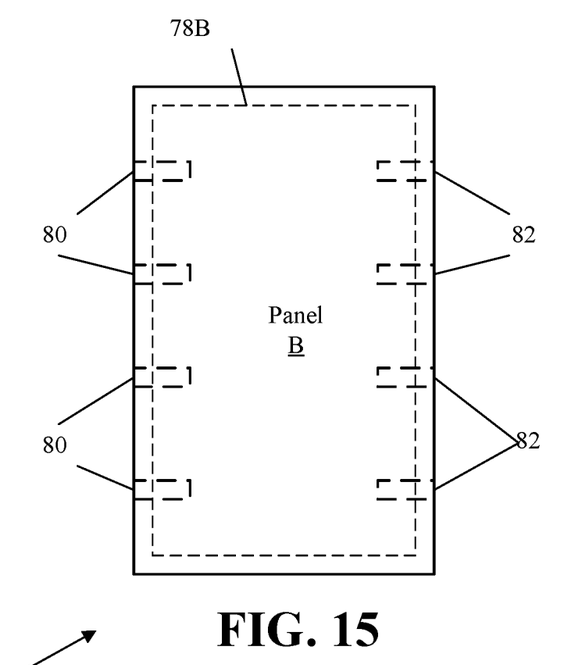
FIG. 15 is a top plan view of an example of a flexible display shown in a phone mode according to an embodiment.
Figure 16:
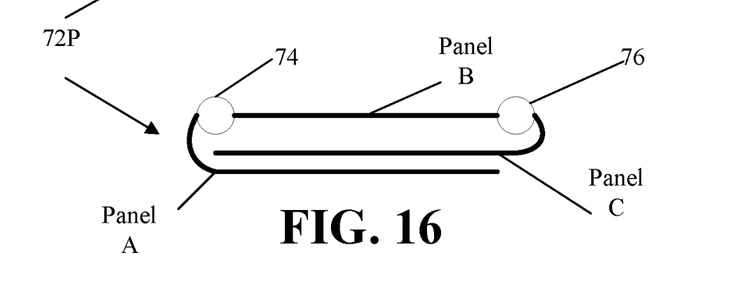
FIG. 16 is a side schematic view of the flexible display of FIG. 15 according to an embodiment.

Another configuration is shown in FIGS. 15-16 according to an embodiment. Panel A has been folded about hinge 74 behind panels B and C, and the configuration presented to the user is of one panel B, which may be of use as a phone. Thus, the configuration shown in FIGS. 15-16 may correspond to a mode that corresponds to phone, and the mode determiner 48 (FIG. 9), discussed above, may determine that user intends to use the device as a phone based on data provided by the bendable sensors 80,82 to define the mode as a phone. The response generator 52 (FIG. 9), discussed above, may direct the display controller 56 (FIG. 9), discussed above, to provide power only to panel B and direct not provide power to panels A or C, since panels A and C may not be used in the phone mode. Thus, a single device may serve as a tablet, a reader, and a phone, offering the user with a form factor and size suited to each.

Figure 17:
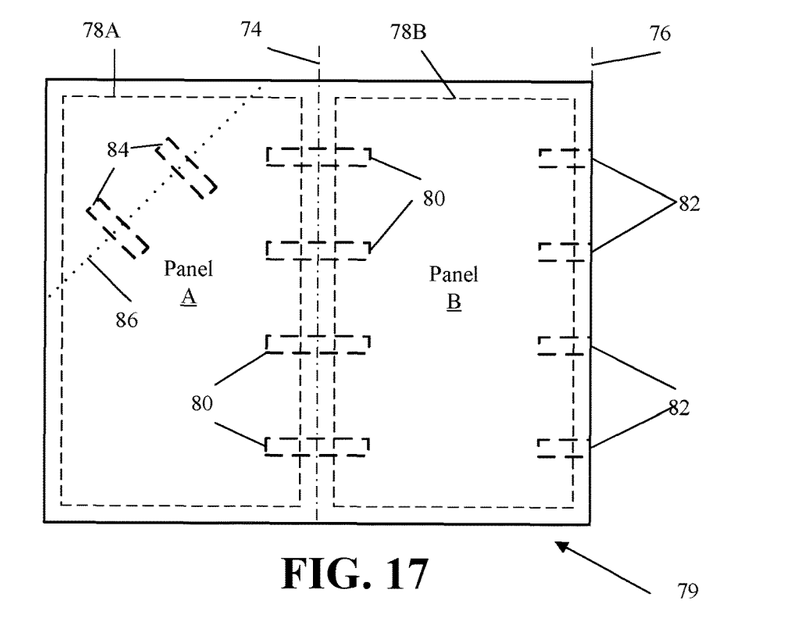
FIG. 17 is a top plan view of an example of a flexible display shown in a book mode according to an embodiment.

FIG. 17 shows an embodiment of a reader similar to the reader shown in FIGS. 13-14, but with the addition of two bendable sensors 84 along a line 86 in panel A of the display 79. Line 86 may overlie hinging in the chassis 78A such that a corner of the panel A may be angled with respect to the rest of panel A. A user may then pivot the corner of the panel 78A about line 86, and this gesture may be interpreted by the gesture analyzer 50 (FIG. 9), discussed above, as corresponding to an indication that the user wishes to turn the page of a book that the user is reading on the reader. Thus, the response generator 52 (FIG. 9), discussed above, may direct a reader application 54 to turn a page. In another example, the gesture may, in the context of a reader, be interpreted as a command to "dog ear" a current page (e.g. mark the current page for easy future reference). Other interpretations for the gesture may be determines, which may depend upon the application 54 in question. The gesture and other gestures may also be used to control other aspects of the device, such as power and performance, link selection, etc.

In general, gestures may be determined based on data provided by bendable sensors located under the display, so that a flexing, twisting, or bending of the display may constitute a gesture. In addition, a squeezing movement may constitute a gesture. For example, when a device is in phone mode (FIG. 15), a user may pick up and grip the device with a squeezing action, and the particular squeezing action may itself be a gesture.

Figure 18:
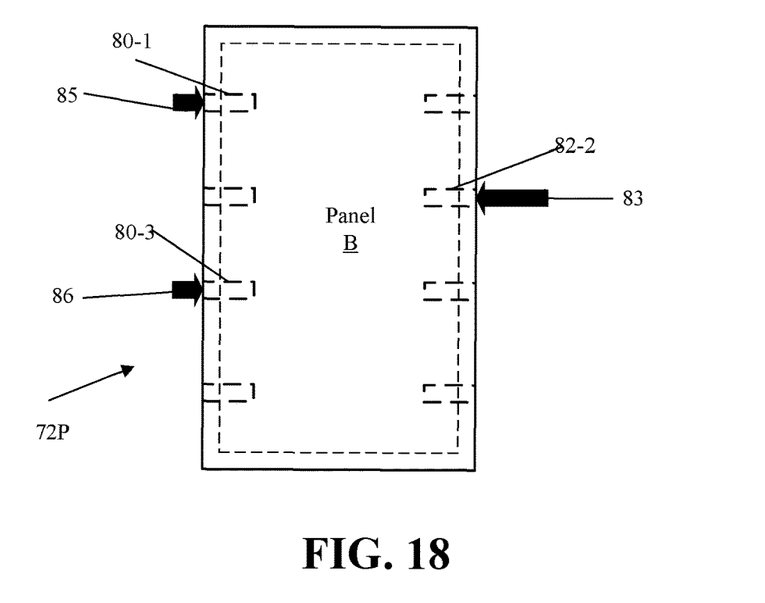
FIG. 18 is a top plan view of an example of a gesture on a flexible display shown in a phone mode according to an embodiment.

As shown in FIG. 18, the device is illustrated with the flexible display 72P folded into a form factor suitable for being held and squeezed. Forces 83, 85, 86 may be applied by the user's fingers or other portions of the user's hand to regions of the flexible display 72P on or near bendable sensors 82-2, 80-1, and 80-3, respectively. The forces 83, 85, 86 may result in a sensed flexing of the flexible display 72P, which may be interpreted as a gesture for example, to answer a call, zoom in on a display, and so forth. Different user-provided loading patterns, either differing in force magnitude or location, may be used to define different gestures.

In another embodiment, bendable sensors or pressure sensors may be provided along upper and lower edges and side edges of a flexible display to permit detection of gestures along these edges, e.g., through squeezing, in addition to gestures detected as user squeezing at the hinges 74, 76.

Figure 19:
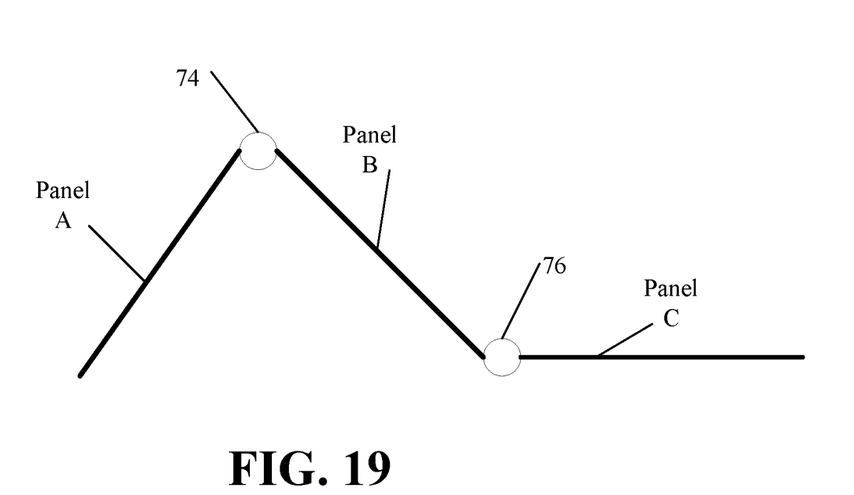
FIGS. 19-20 are side schematic views of additional example configurations of a flexible display according to embodiments.
Figure 20:
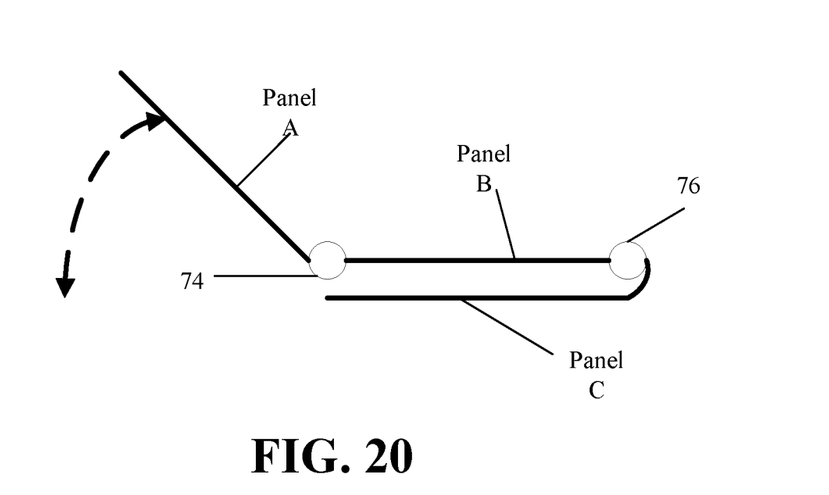

The aforementioned examples show the mode as corresponding to a tablet, a reader, or a phone, but an angular position of the panels A, B, and C may be used to define other modes as well as gestures. For example, FIG. 19 shows an embodiment in which panels A and B are propped up above panel C. The illustrated positioning of panels A, B, and C may define a gesture such as a command to open or close an application, or to draft an email. In addition, FIG. 20 shows an embodiment in which the pivoting of a panel with respect to panels B and C (folded behind panel A) is interpreted as a gesture to turn a page in a reader. Many other gestures may be defined in terms of the position and movement of the panels with respect to one another, which may correspond to modes as well.

Figure 21:
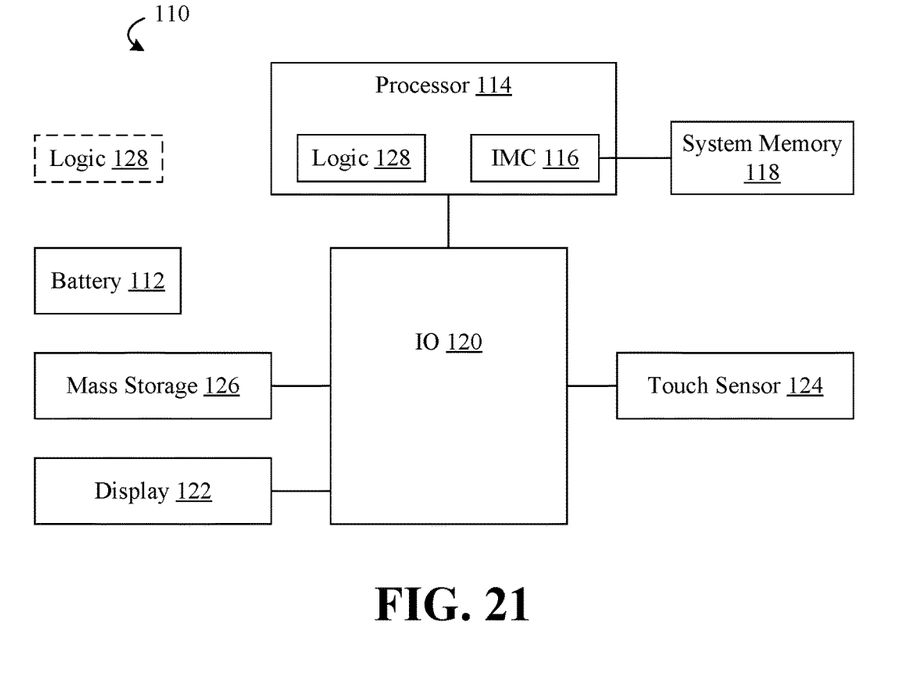
FIG. 21 is a block diagram of an example of a computing system according to an embodiment.

Turning now to FIG. 21, a computing device 110 is illustrated according to an embodiment. The computing device 110 may be part of a platform having computing functionality (e.g., personal digital assistant/PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) or any combination thereof (e.g., mobile Internet device/MID). In the illustrated example, the device 110 includes a battery 112 to supply power to the device 110 and a processor 114 having an integrated memory controller (IMC) 116, which may communicate with system memory 118. The system memory 118 may include, for example, dynamic random access memory (DRAM) configured as one or more memory modules such as, for example, dual inline memory modules (DIMMs), small outline DIMMs (SODIMMs), etc.

The illustrated device 110 also includes a input output (IO) module 120, sometimes referred to as a Southbridge of a chipset, that functions as a host device and may communicate with, for example, a display 122 (e.g., touch screen, liquid crystal display/LCD, light emitting diode/LED display), a touch sensor 124 (e.g., a touch pad, etc.), and mass storage 126 (e.g., hard disk drive/HDD, optical disk, flash memory, etc.). The illustrated processor 114 may execute logic 128 (e.g., logic instructions, configurable logic, fixed-functionality logic hardware, etc., or any combination thereof) configured to function similarly to the system 30.

ADDITIONAL NOTES AND EXAMPLES

Example 1 may include a system to interpret user interactions with a device having a flexible display, comprising a portable device having a flexible display, a plurality of bendable sensors coupled to the flexible display, wherein at least one of the plurality of bendable sensors is to generate sensor data in response to detecting a bending movement applied to the flexible display, a display analyzer to make a determination of at least one of a device mode and a gesture, the determination based at least on the sensor data from the at least one of the plurality of bendable sensors, and a response generator to generate a response based on the determined at least one of a device mode and a gesture.

Example 2 may include the system of Example 1, wherein the response to the determination of the gesture is to include at least one of a page turn, a zoom command, a change to a power setting, a link selection, an adjustment to a level of volume, a brightness control, and a cursor movement.

Example 3 may include the system of any one of Examples 1 to 2, wherein the flexible display is to include a plurality of panels that are to be foldable with respect to one another into a plurality of arrangements that each are to correspond to a device mode.

Example 4 may include the system of any one of Examples 1 to 3, wherein the plurality of panels are to be foldable along at least one hinge that is to include a row of bendable sensors underneath the flexible display at the at least one hinge.

Example 5 may include the system of any one of Examples 1 to 4, further including a mode determiner to determine a device mode that is to include one of a phone, a reader, or a tablet based on the sensor data from the at least one of the plurality of bendable sensors.

Example 6 may include the system of any one of Examples 1 to 5, further including a gesture analyzer to determine the gesture based on the sensor data from the at least one of the plurality of bendable sensors, wherein the gesture is to correspond to at least one of a squeezing movement, a twisting movement, a flexing movement, a swiping movement, and a bending movement.

Example 7 may include an apparatus to interpret user interactions with a device having a flexible display, comprising a flexible display, a plurality of bendable sensors coupled to the flexible display, wherein at least one of the plurality of bendable sensors is to generate sensor data in response to detecting a bending movement applied to the flexible display, a display analyzer to make a determination of at least one of a device mode and a gesture, the determination based at least on the sensor data from the at least one of the plurality of bendable sensors, and a response generator to generate a response based on the determined at least one of a device mode and a gesture.

Example 8 may include the apparatus of Example 7, wherein the response to the determination of the gesture is to include at least one of a page turn, a zoom command, a change to a power setting, a link selection, an adjustment to a level of volume, a brightness control, and a cursor movement.

Example 9 may include the apparatus of any one of Examples 7 to 8, wherein the flexible display is to include a plurality of panels that are to be foldable with respect to one another into a plurality of arrangements that each are to correspond to a device mode.

Example 10 may include the apparatus of any one of Examples 7 to 9, wherein the plurality of panels are to be foldable along at least one hinge that is to include a row of bendable sensors underneath the flexible display at the at least one hinge.

Example 11 may include the apparatus of any one of Examples 7 to 10, further including a mode determiner to determine a device mode that is to include one of a phone, a reader, or a tablet based on the sensor data from the at least one of the plurality of bendable sensors.

Example 12 may include the apparatus of any one of Examples 7 to 11, further including a gesture analyzer to determine the gesture based on the sensor data from the at least one of the plurality of bendable sensors, wherein the gesture is to correspond to at least one of a squeezing movement, a twisting movement, a flexing movement, and a bending movement.

Example 13 may include a method to interpret user interactions with a device having a flexible display, comprising analyzing sensor data from at least one of a plurality of bendable sensors that are to generate sensor data in response to detecting a bending movement applied to determine at least one of a device mode and a gesture, and generating a response based on the determined at least one of a device mode and a gesture.

Example 14 may include the method of Example claim 13, wherein the response to the determination of the gesture includes at least one of a page turn, a zooming command, a change to a power setting, a link selection, an adjustment to a level of volume, a brightness control, and a cursor movement.

Example 15 may include the method of any one of Examples 13-14, wherein the flexible display includes a plurality of panels that are foldable with respect to one another into a plurality of arrangements, the method further including determining the device mode based on an arrangement.

Example 16 may include the method of any one of Examples 13-15, wherein each of the plurality of panels is foldable along at least one hinge that includes a row of bendable sensors underneath the flexible display at the at least one hinge.

Example 17 may include the method of any one of Examples 13-16, further including determining a device mode including one of a phone, a reader, or a tablet based on the sensor data from the at least one of the plurality of bendable sensors.

Example 18 may include the method of any one of Examples 13-17, further including determining the gesture based on the sensor data from the at least one of the plurality of bendable sensors, wherein the gesture corresponds to at least one of a squeezing movement, a twisting movement, a flexing movement, and a bending movement of the flexible display.

Example 19 may include at least one computer readable storage medium comprising a set of instructions, which when executed by an apparatus, cause the apparatus to analyze sensor data from at least one of a plurality of bendable sensors that are to generate sensor data in response to detecting a bending movement applied to determine at least one of a device mode and a gesture, and generate a response based on the determined at least one of a device mode and a gesture.

Example 20 may include the at least one computer readable storage medium of Example 19, wherein the response to the determination of the gesture is to include at least one of a page turn, a zooming command, a change to a power setting, a link selection, an adjustment to a level of volume, a brightness control, and a cursor movement.

Example 21 may include the at least one computer readable storage medium of any one of Examples 19 to 20, wherein the flexible display is to include a plurality of panels that are to be foldable with respect to one another into a plurality of arrangements, and wherein the instructions, when executed, cause an apparatus to determine the device mode based on an arrangement.

Example 22 may include the at least one computer readable storage medium of any one of Examples 19 to 21, wherein each of the plurality of panels is to be foldable along at least one hinge that is to include a row of bendable sensors underneath the flexible display at the at least one hinge.

Example 23 may include the at least one computer readable storage medium of any one of Examples 19 to 22, wherein the instructions, when executed, cause the apparatus to determine a device mode that is to include one of a phone, a reader, or a tablet based on the sensor data from the at least one of the plurality of bendable sensors.

Example 24 may include the at least one computer readable storage medium of any one of Examples 19 to 23, wherein the instructions, when executed, cause the apparatus to determine the gesture based on the sensor data from the at least one of the plurality of bendable sensors, wherein the gesture is to correspond to at least one of a squeezing movement, a twisting movement, a flexing movement, and a bending movement of the flexible display.

Example 25 may include an apparatus to interpret user interactions with a device having a flexible display, comprising a portable device having a flexible display, a plurality of bendable sensors, wherein at least one of the plurality of bendable sensors is to generate data in response to a flex of the display, and means for determining one or more of a device mode or a gesture based at least on the data from the at least one of the plurality of bendable sensors.

Example 26 may include the apparatus of Example 25, wherein the flexible display is to assume a plurality of conformations, each conformation of the plurality of conformations to correspond to at least one device mode.

Example 27 may include the apparatus of any one of Examples 25 to 26, wherein the display is to include a plurality of panels that are to be foldable with respect to one another.

Example 28 may include the apparatus of any one of Examples 25 to 27, further including a rigid chassis for each of the plurality of panels.

Example 29 may include the apparatus of any one of Examples 25 to 28, wherein the plurality of bendable sensors are to be flexible.

Example 30 may include the apparatus of any one of Examples 25 to 29, wherein the plurality of panels are to be foldable along hinges, each hinge to be associated with at least one of the plurality of bendable sensors.

Example 31 may include the apparatus of any one of Examples 25 to 30, wherein the plurality of bendable sensors are to be adjacent to the flexible display.

Example 32 may include the apparatus of any one of Examples 25 to 31, further including means for determining a device mode based on the data from the at least one sensor.

Example 33 may include the apparatus of any one of Examples 25 to 32, further including means for determining the gesture based on the data from the at least one sensor.

Example 34 may include the apparatus of any one of Examples 25 to 33, wherein the device mode is to include one or more of a phone, a reader, or a tablet.

Example 35 may include the apparatus of any one of Examples 25 to 34, wherein the gesture is to include one or more of a squeezing, a flexing, a twisting, or a bending of at least part of the flexible display.

Example 36 may include the apparatus of any one of Examples 25 to 35, wherein the gesture is to be interpreted as a command to one or more of turn a page, change a level of device volume, select a link, resize a display, or scroll a display.

Example 37 may include the apparatus of any one of Examples 25 to 36, wherein a portion of the plurality of bendable sensors are to be arranged back-to-back with respect to one another.

Example 38 may include the apparatus of any one of Examples 25 to 37, wherein a portion of the plurality of bendable sensors are to be arranged along a diagonal with respect to a corner of the flexible display.

Example 39 may include the apparatus of any one of Examples 25 to 38, wherein the flexible display is to be divided into panels by at least one hinge portion, and wherein a row of flexible sensors are to be adjacent to the at least one hinge portion.

Example 40 may include the apparatus of any one of Examples 25 to 39, wherein the flexible display is to include an organic light emitting diode (OLED) flexible display.

Example 41 may include the apparatus of any one of Examples 25 to 40, wherein the flexible display is to include three panels.

Example 42 may include the apparatus of any one of Examples 25 to 41, wherein the flexible display is to include a capacitive touch sensor.

Example 43 may include the apparatus of any one of Examples 25 to 42, wherein the flexible display is to include a pressure sensor.

Example 44 may include the apparatus of any one of Examples 25 to 43, further including means for generating a response to determining one or more of the device mode or the gesture.

Example 45 may include a method of interacting with a flexible screen, comprising detecting a bending movement in one or more flexible sensors adjacent to the flexible screen, and determining a gesture based on the bending movement.

Example 46 may include the method of Example 45, further including determining a screen mode based on the bending movement.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
    a portable device having a flexible display;
    a plurality of bendable sensors coupled to the flexible display, wherein at least one of the plurality of bendable sensors is to generate sensor data in response to detecting a bending movement applied to the flexible display;
    a display analyzer, implemented at least partly in one or more of configurable logic or fixed functionality logic hardware, to make a determination of one or more of a device mode or a gesture, the determination based at least on the sensor data from the at least one of the plurality of bendable sensors;
    a mode determiner, implemented at least partly in one or more of configurable logic or fixed functionality logic hardware, to determine a device mode that is to include one of a phone, a reader, or a tablet based on the sensor data from the at least one of the plurality of bendable sensors; and
    a response generator, implemented at least partly in one or more of configurable logic or fixed functionality logic hardware, to generate a response based on the determined one or more of a device mode or a gesture.

2. The system of claim 1, wherein the response to the determination of the gesture is to include one or more of a page turn, a zoom command, a change to a power setting, a link selection, an adjustment to a level of volume, a brightness control, or a cursor movement.

3. The system of claim 1, wherein the flexible display is to include a plurality of panels that are to be foldable with respect to one another into a plurality of arrangements that each are to correspond to a device mode.

4. The system of claim 3, wherein the plurality of panels are to be foldable along at least one hinge that is to include a row of bendable sensors underneath the flexible display at the at least one hinge.

5. The system of claim 1, further including a gesture analyzer, implemented at least partly in one or more of configurable logic or fixed functionality logic hardware, to determine the gesture based on the sensor data from the at least one of the plurality of bendable sensors, wherein the gesture is to correspond to one or more of a squeezing movement, a twisting movement, a flexing movement, a swiping movement, or a bending movement.

6. An apparatus comprising:
    a flexible display;
    a plurality of bendable sensors coupled to the flexible display, wherein at least one of the plurality of bendable sensors is to generate sensor data in response to detecting a bending movement applied to the flexible display;
    a display analyzer, implemented at least partly in one or more of configurable logic or fixed functionality logic hardware, to make a determination of one or more of a device mode or a gesture, the determination based at least on the sensor data from the at least one of the plurality of bendable sensors;
    a mode determiner, implemented at least partly in one or more of configurable logic or fixed functionality logic hardware, to determine a device mode that is to include one of a phone, a reader, or a tablet based on the sensor data from the at least one of the plurality of bendable sensors; and
    a response generator, implemented at least partly in one or more of configurable logic or fixed functionality logic hardware, to generate a response based on the determined one or more of a device mode or a gesture.

7. The apparatus of claim 6, wherein the response to the determination of the gesture is to include one or more of a page turn, a zoom command, a change to a power setting, a link selection, an adjustment to a level of volume, a brightness control, or a cursor movement.

8. The apparatus of claim 6, wherein the flexible display is to include a plurality of panels that are to be foldable with respect to one another into a plurality of arrangements that each are to correspond to a device mode.

9. The apparatus of claim 8, wherein the plurality of panels are to be foldable along at least one hinge that is to include a row of bendable sensors underneath the flexible display at the at least one hinge.

10. The apparatus of claim 6, further including a gesture analyzer, implemented at least partly in one or more of configurable logic or fixed functionality logic hardware, to determine the gesture based on the sensor data from the at least one of the plurality of bendable sensors, wherein the gesture is to correspond to one or more of a squeezing movement, a twisting movement, a flexing movement, or a bending movement.

11. A method comprising:
analyzing sensor data from at least one of a plurality of bendable sensors that are to generate sensor data in response to detecting a bending movement applied to determine one or more of a device mode or a gesture, wherein to determine a device mode includes determining a device mode corresponding to one of a phone, a reader, or a tablet based on the sensor data from the at least one of the plurality of bendable sensors; and
generating a response based on the determined one or more of a device mode or a gesture.

12. The method of claim 11, wherein the response to the determination of the gesture includes one or more of a page turn, a zooming command, a change to a power setting, a link selection, an adjustment to a level of volume, a brightness control, or a cursor movement.

13. The method of claim 11, wherein the flexible display includes a plurality of panels that are foldable with respect to one another into a plurality of arrangements, the method further including determining the device mode based on an arrangement.

14. The method of claim 13, wherein each of the plurality of panels is foldable along at least one hinge that includes a row of bendable sensors underneath the flexible display at the at least one hinge.

15. The method of claim 11, further including determining the gesture based on the sensor data from the at least one of the plurality of bendable sensors, wherein the gesture corresponds to one or more of a squeezing movement, a twisting movement, a flexing movement, or a bending movement of the flexible display.

16. At least one non-transitory computer readable storage medium comprising a set of instructions, which when executed by an apparatus, cause the apparatus to:
analyze sensor data from at least one of a plurality of bendable sensors that are to generate sensor data in response to detecting a bending movement applied to determine one or more of a device mode or a gesture, wherein to determine a device mode includes determining a device mode corresponding to one of a phone, a reader, or a tablet based on the sensor data from the at least one of the plurality of bendable sensors; and
generate a response based on the determined one or more of a device mode or a gesture.

17. The at least one non-transitory computer readable storage medium of claim 16, wherein the response to the determination of the gesture is to include one or more of a page turn, a zooming command, a change to a power setting, a link selection, an adjustment to a level of volume, a brightness control, or a cursor movement.

18. The at least one non-transitory computer readable storage medium of claim 16, wherein the flexible display is to include a plurality of panels that are to be foldable with respect to one another into a plurality of arrangements, and wherein the instructions, when executed, cause an apparatus to determine the device mode based on an arrangement.

19. The at least one non-transitory computer readable storage medium of claim 18, wherein each of the plurality of panels is to be foldable along at least one hinge that is to include a row of bendable sensors underneath the flexible display at the at least one hinge.

20. The at least one non-transitory computer readable storage medium of claim 16, wherein the instructions, when executed, cause the apparatus to determine the gesture based on the sensor data from the at least one of the plurality of bendable sensors, wherein the gesture is to correspond to one or more of a squeezing movement, a twisting movement, a flexing movement, or a bending movement of the flexible display.

* * * * *